Aug. 14, 1945.  E. W. LOGUE  2,382,800
FORCED DRAFT HEATER
Filed Feb. 6, 1942  3 Sheets-Sheet 1
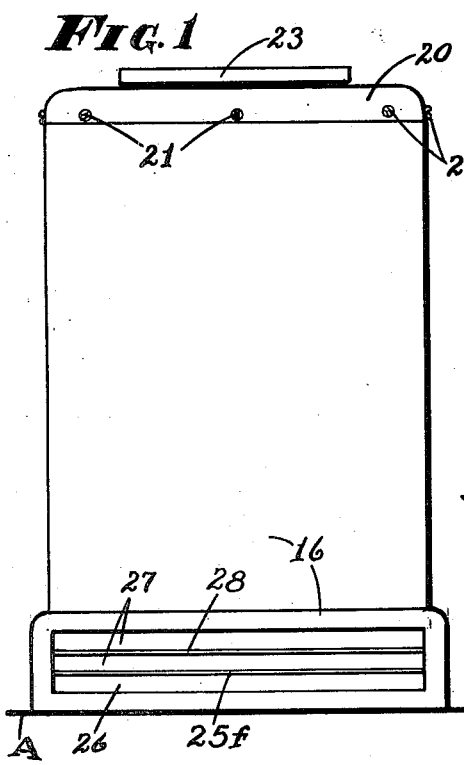
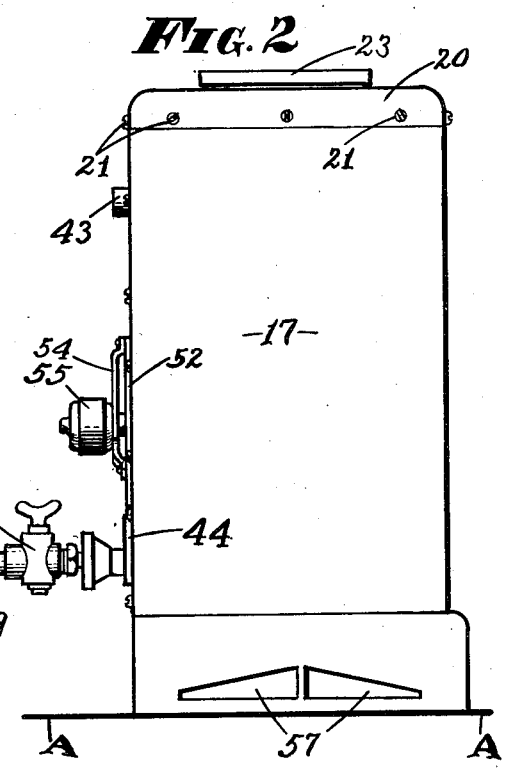
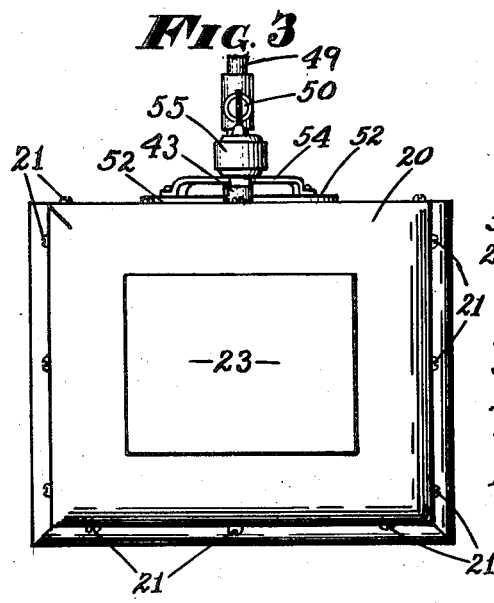
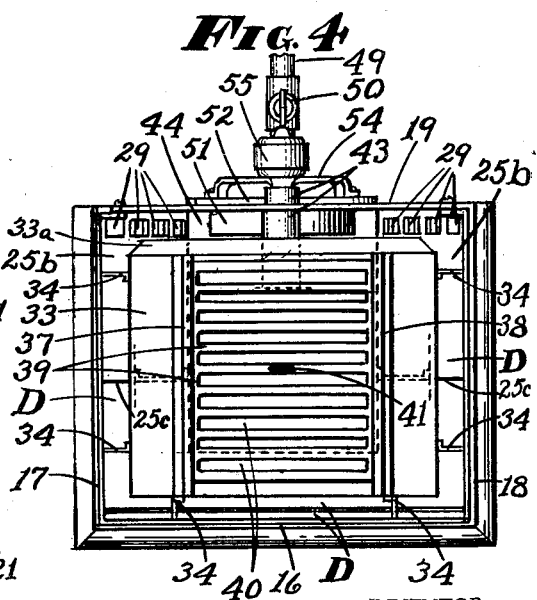
INVENTOR.
Eugene W. Logue
BY M. Y. Charles
ATTORNEY Aug. 14, 1945.  E. W. LOGUE  2,382,800
FORCED DRAFT HEATER
Filed Feb. 6, 1942  3 Sheets-Sheet 2
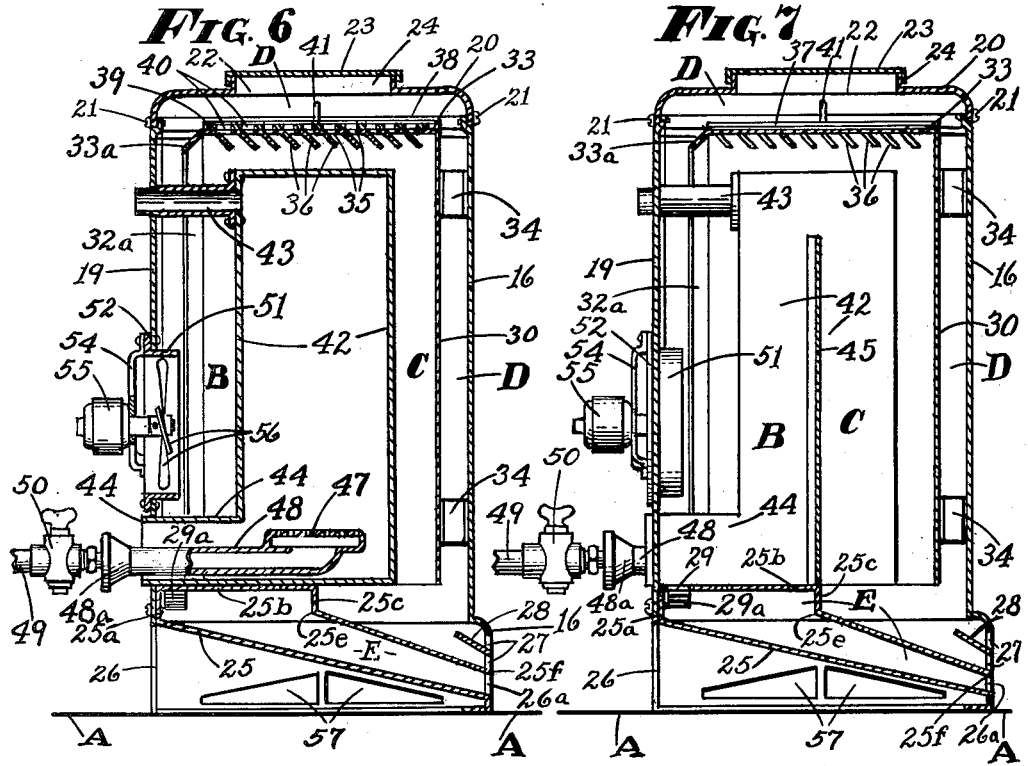
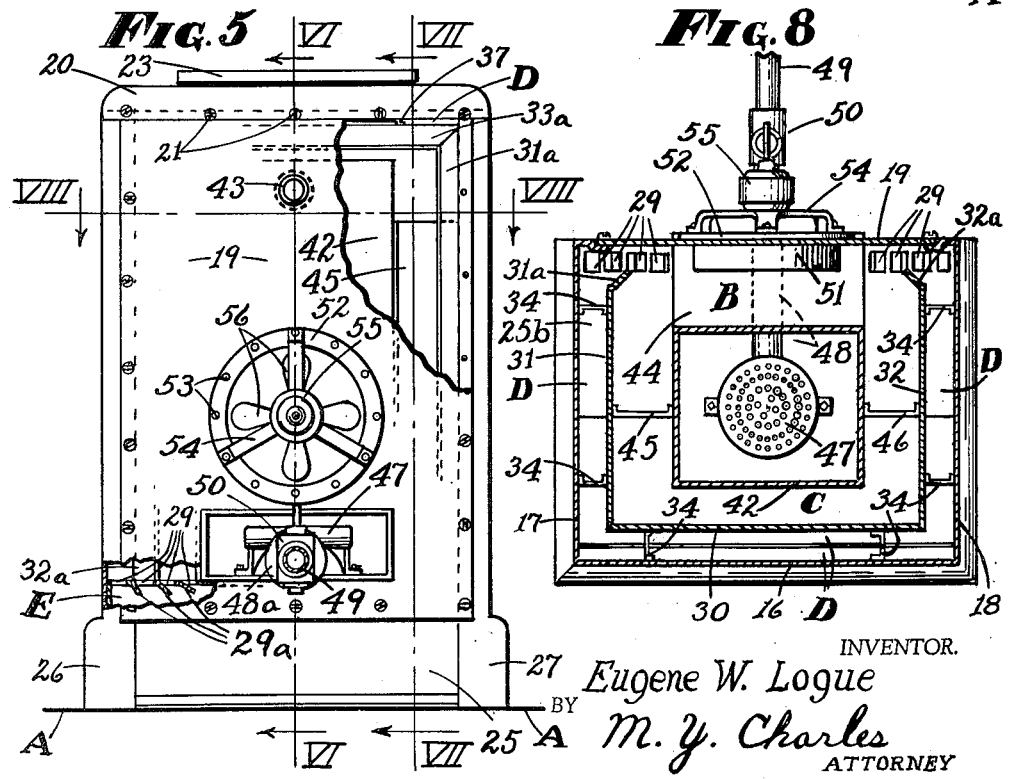
INVENTOR.
Eugene W. Logue
BY M. Y. Charles
ATTORNEY Aug. 14, 1945.                E. W. LOGUE                2,382,800
                          FORCED DRAFT HEATER
                     Filed Feb. 6, 1942            3 Sheets-Sheet 3
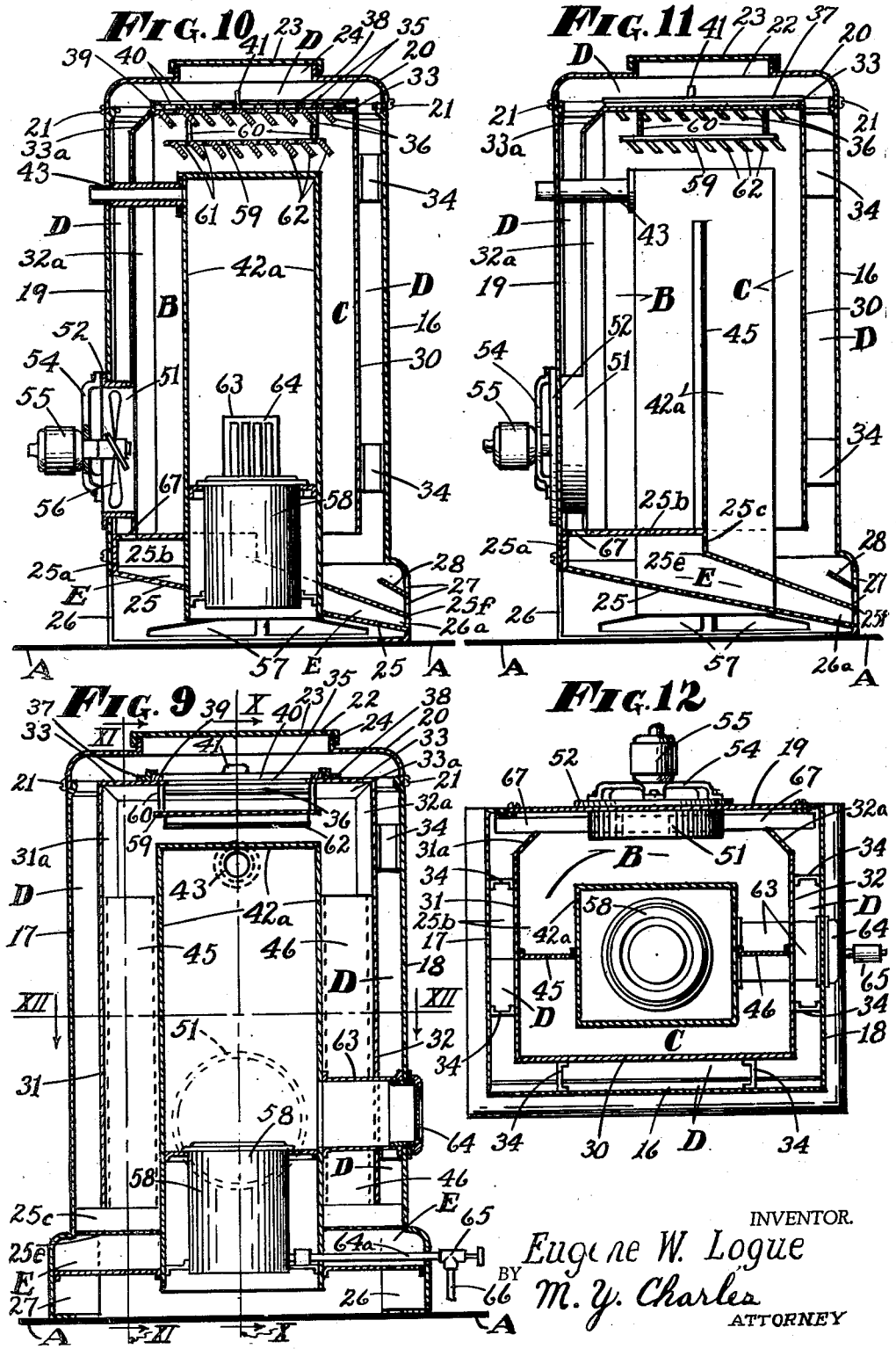
INVENTOR.
Eugene W. Logue
BY M. Y. Charles
ATTORNEY Patented Aug. 14, 1945

2,382,800

UNITED STATES PATENT OFFICE 2,382,800

FORCED DRAFT HEATER

Eugene W. Logue, Caldwell, Kans., assignor to Julia E. Logue, Caldwell, Kans.

Application February 6, 1942, Serial No. 429,737

3 Claims. (Cl. 126—110)

This invention is an improvement over my Patent No. 2,263,362, dated November 18, 1941.

My invention relates to an improvement in forced draft heating devices, and has for its object to provide a heater that will efficiently heat air and then discharge the air therefrom in such a manner that the heated air will ride along the floor line of the space being heated for great distances and will gradually rise from the floor line into the space being heated. The result of this action is such that the space being heated will have substantially an even temperature throughout.

Another object is to discharge the heating draft of air from the heater substantially on the floor line.

A further object is to discharge a heating draft of air from the heater that is a forced draft.

A still further object is to provide a heating device of the kind mentioned which, if necessary, will operate on the principle of a natural draft heater.

Another object is to provide a heating device of the kind mentioned that will do the heating job as above mentioned, yet the outside walls of the heater will remain quite cool.

Still another object is to provide a heating device of the kind mentioned that is inexpensive to make so that the device can be sold at a moderate price. The device is simple and easy to make; it is durable and long lived; and the device may be heated with any suitable fuel, although as shown in the drawings the device is heated with either a gas or oil burner.

It will be understood that any other heating means may be used, such as coal or wood and the like. These and other objects will be more fully described as this description progresses.

Due to the general design and addition of new parts and arrangements thereof as well as the introduction of new means of directing the flow of air currents through the machine, the foregoing objects are accomplished. All these features of addition and improvement are obvious when the drawings and description of this invention are compared with those of my prior Patent No. 2,263,362.

Now referring to the accompanying drawings, Fig. 1 is a front view of my improved forced draft heater device.

Fig. 2 is a side view of my improved forced draft heater device.

Fig. 3 is a top plan view of my improved forced draft heater device.

Fig. 4 is a top view of my improved forced draft heater device, the top of the outside housing being removed for convenience of illustration.

Fig. 5 is a rear view of my improved forced draft heater device, parts being broken away for convenience of illustration.

Fig. 6 is a vertical detail sectional view through the heater device, the view being taken along the line VI—VI in Fig. 5 and looking in the direction of the arrows.

Fig. 7 is a detail sectional view through the heater device, the view being taken along the line VII—VII in Fig. 5 and looking in the direction of the arrows.

Fig. 8 is a horizontal detail sectional view through the heater device, the view being taken along the line VIII—VIII in Fig. 5 and looking in the direction of the arrows.

Fig. 9 is a vertical detail sectional view through the center portion of a modified form of the heater device in which an oil burner is used, the view being taken from a point in front of the heater device.

Fig. 10 is a vertical detail sectional view through the heater device shown in Fig. 9, the view being taken along the line X—X in Fig. 9 and looking in the direction of the arrows.

Fig. 11 is a vertical sectional detail view through the heater device shown in Fig. 9, the view being taken along the line XI—XI in Fig. 9 and looking in the direction of the arrows.

Fig. 12 is a horizontal sectional detail view of the heater device shown in Fig. 9, the view being taken along the line XII—XII in Fig. 9, and looking in the direction of the arrows.

Similar numerals of reference designate the same parts throughout the several figures of the drawings.

In the drawings is shown my improved heating device having a preferably rectangular shaped housing consisting of a front wall 16, side walls 17 and 18, and a rear wall plate element 19. The lower portion of the front wall 16 and the side walls 17 and 18 are curved outwardly and thence downwardly to form an enlarged base portion of the stove as shown. The housing walls 16, 17, 18 and 19 are provided with a top closure element 20 that rests thereon and is fastened thereto by means of bolts 21. The central portion of the closure element 20 is provided with an opening 22 over which is positioned a closure lid 23 that rests on upwardly extending flange portions 24 of the closure element and which surrounds the opening 22.

The housing above described is provided with an inclined bottom closure element 25 which slopes downwardly from the rear to the front of the housing and to a point adjacent the floor. The rear end of the incline closure element is supported between the side wall elements 17 and 19 on rear leg like elements 26 and 27 which support the rear of the device so as to make it stand in a substantial and vertical position as shown. The rear portion of the inclined bottom closure element 25 is turned upwardly between the walls 17 and 18 as shown at 25a and then inwardly in a level position as at 25b to a point approximately midway between the front and rear walls 16 and 19 and then turned down to substantially a vertical position 25c to a point 25e spaced above the bottom closure element 25, and then sloping downward and forward to the front wall 16 to a point 25f which is also spaced above the bottom closure 25 so as to leave an opening 26a in the front wall 16, the bottom of the opening 26a being close to the floor line.

In the front wall 16 is a second opening 27 that is divided from the opening 26a only by the inclined floor portion between the points 25e and 25f. In the opening 26 is positioned a baffle plate 28 which horizontally spans the opening 27 and stands at a little steeper inclined position than the floor closure element between the points 25e and 25f.

In the floor closure element 25b and at the rear thereof, is a plurality of openings or holes 29 which open into the space E between the bottom closure element 25 and the floor elements 25b, 25c and 25e—25f which form a cold air duct extending across the width of the heater and being directed in a downward direction from the rear to the front of the heater and having a discharge opening 26a in the front wall 16 of the heater and substantially at the floor line A. At the openings 29 are depending baffles 29a that are directed downwardly and toward the central portion of the face E.

Within the housing above described is positioned a sub-housing which comprises a front wall section 30, two side wall sections 31 and 32, and a top plate 33, all of which are spaced substantially equal distance from their corresponding outside walls and cover of the housing. The sub-housing is supported by a portion of the lower edges of the side wall elements 31 and 32 which rest on the level portion 25b of the floor portion of the heater device, and the sub-housing is held in place by spacer elements 34 that are rigidly attached, preferably by being spot welded, to the corresponding wall elements of the outside housing and the inside sub-housing as shown, there being no rear wall of the sub-housing, however the rear vertical edge portion of the side walls 31 and 32 are turned inwardly as indicated at 31a and 32a. The bottom of the forward portion of the sub-housing from the vertical floor portion 25c to the front wall 30, and between the side walls 31 and 32 is open to provide an air discharge downwardly against the inclined floor portion 25e—25f and thence outwardly through the opening 27. The rear edge portion of the top plate 33 of the sub-housing is bent downwardly as indicated at 33a and joins the inwardly turned portion 31a and 32a of the side walls 31 and 32 of the sub-housing as shown. The central portion of the top plate 33 is provided with a series of parallel slots 35 that are spaced apart and separated by intermediate strips of metal which are a part of the top plate 33 and from which depend deflector plates 36 that are positioned in a sloping position in the direction of the air flow through the sub-housing.

On the upper side of the top plate 33 and at either end of the slots 35 are Z-shaped pieces 37 and 38 that are rigidly fixed to the top plate 33 which form opposing channels in which is slidably mounted a plate 39 that is provided with a series of parallel slots 40 that are of such size and are so located that they will register with the slots 35 in the top plate 33 so that by sliding the plate 39 forward and rearward the slots 35 may be opened or closed. The plate 39 is provided with an upwardly extending lip 41 by which the plate 39 may be moved or slid to open or close the slots 35.

Centrally positioned within the sub-housing, and resting on the level floor portion 25b is a heat box or drum 42, the upper end of which is spaced below the top plate 33 of the sub-housing and the walls of which are spaced away from the walls of the sub-housing so as to provide an air passage between the heating drum 42 and the sub-housing. The upper portion of the heating drum is provided with a draft flue 43 which extends rearwardly through the rear wall 19 of the outside housing for the attachment of a stove pipe (not shown), thereto as will be readily understood. The bottom of the heating drum 42 is provided with an open rearwardly extending duct 44 that extends through the rear wall 19 of the housing.

At 45 and 46 is shown partition elements that are positioned midway between the front and rear walls of the heating drum and span between the heating drum and the adjacent side walls of the sub-housing, the partition elements 45 and 46 extending from the level floor portion 25b upwardly to a point well below the top of the heating drum 42 so as to form a rear and front air circulation passage B and C around the heating drum. The bottom of the heating passage C is open so as to discharge against the sloping floor portion 25e and 25f which in turn will direct the flow of hot air from the heating passage C to and through the air discharge opening 27.

The sub-housing 30, 31—31a, 32—32a, 33 provides a cool air and insulating passage D around the outside of the sub-housing and this passage D also discharges against the sloping floor elements 25e and 25f.

Centrally positioned within the heating drum 42 and on the floor thereof is a gas burner 47 having an air and fuel mixing tube 48 that extends through the air duct 44. At 49 is a gas fuel feed pipe connecting with a fuel control valve 50 that feeds gas fuel to the gas and air mixer 48a and the fuel pipe 48 of the gas burner 47.

The rear wall 19 of the outside housing is provided with a large circular hole in which is positioned the inwardly extending flange portion 51 of a ring 52 that is rigidly fixed by means of rivets or bolts 53 to the rear wall 19 of the outside housing.

Rigidly attached to the ring 52 is a spider element 54, on which is rigidly fixed an electric motor 55 having the usual rotatable shaft on which is rigidly mounted a fan 56 that is adapted to draw air in through the opening of the ring and flange 52—51 and discharge the air into the outside and sub-housing and thereby raise a low static pressure of air therein that will be discharged therefrom through the openings 27 and 26a as will later be explained.

The lower base portion of the side walls 17 and 18 are provided with openings 57 that are positioned below the inclined bottom 25 of the outside housing so as to permit a flow of outside air under the bottom 25 as a means of cooling the bottom 25. The rear side of the base portion of the outside housing is left open so that a flow of outside air therethrough will also contact the sloping bottom 25 to assist in the cooling thereof.

In Figures 9 to 12 inclusive the device is shown as having an oil burner 58 which calls for some modification of some parts of the structure of the device to make provision for some of the characteristics of an oil burner of the pot type which will put out a volume of heat that will heat the upper portion of the heating drum to a point where the heat would radiate therefrom in sufficient quantity to cause the upper portion of the outside housing to over heat. This excessive heating of the upper portion of the outside housing is avoided by the introduction of an intermediate plate 59 that is positioned above the top of the heating drum 42a and the top plate 33 of the sub-housing. The plate 59 is supported by rods 60 that are attached to and depend from the top plate 33 of the sub-housing. The plate 59 is provided with a plurality of parallel slots 61 and a plurality of sloping baffle plates 62, one for each slot 61, and the baffle plates 62 are pitched in the direction of the travel of the flow of air through the housing and sub-housing.

Due to the design of the oil burner 58, the bottom of the heating drum is left open and the lower portion of the heating drum 42a passes through the floor members 25b, 25c, 25e—25f and the bottom 25 so as to provide an adequate vertical draft of air for the oil burner 58. The heating drum 42a is provided with a duct 63 that opens from the interior of the heating drum 42a at a point just above the oil burner 58 to the outside of the housing wall 18 and is provided with a door 64 as a closure for the duct 63 through which the burner 58 may be lit and also through which the flame of the burner 58 may be observed. The oil burner 58 is provided with a fuel supply pipe 64a that extends from the burner 58 through the base portion of the side 18 of the housing to a fuel control valve 65. At 66 is a fuel feed pipe connecting with the valve 65 as a means of delivering fuel oil to the control valve 65 and the oil burner 58.

The rear portion of the floor 25 of the heater is provided with a slot 67 for the admittance of cool air from the housing into the cool air duct E.

The operation of the heater device is as follows: The burner 47 or 58 is lit, whereupon the heat from the flame of the burner will heat the heating drum 42 or 42a. The electric motor and fan 55—56 are started. The fan will produce a low static pressure in the passages B, C, D and E, whereupon a movement of air will take place in the heater first in an upward direction in the rear portion of the heater to enter the passages D and B and then flow across the top portion of the heater into the passages C and D and at the bottom thereof the currents of air from the passages C and D merge and move toward the front of the heater and are discharged therefrom through the opening 27 as a stream of heated air to be used for heating purposes. Simultaneously with the foregoing described action, cool air will pass through the slot 67 or holes 29 into the duct or space E whereupon the air will be partially directed toward the central portion of the passage E so as to give equal distribution of air across the air discharge opening 26a. The upper layer of air, discharged from upper discharge passage 27 is, for the most part, slightly warmed air from D, while the lower layer of air, discharged from lower discharge passage 27 is, for the most part, hot air from C. These two layers of air move along together and are projected onto the carrier layer of cool air from E, the hot air layer being, in effect, sandwiched between the upper warm layer and the lowermost cool or carrier layer. The upper, only slightly warmed air layer prevents the hot air layer from rising too rapidly, so that the hot air is carried to the far sides of the room, and so the room is thereby evenly heated.

The air, in traveling the courses above outlined, becomes intensely heated in the passages B and C from contacting the heating drum 42 or 42a, while that portion of the air flowing through the passages D and therefore in contact with the outside walls of the heater will be quite cool even though the heater is working at a high temperature and is discharging quite hot air through the opening 27. In other words, the air in insulating passageway D insulates the outer casing 16 from the hot sub-housing 30 and so prevents overheating of the outer casing. The air passing through the passage E and being discharged through the opening 26a is still cooler than the air flowing through the passages D because it has had very little contact with the heating drum 42 or 42a.

The air being discharged from the opening 26a being cool will normally flow for long distances on the floor A without having much of any tendency to rise in the room. Now the air being discharged from the opening 27 is hot, but is being discharged in the same direction as, and on top of the flow from passage 26a. Therefore the flow of cool air from the opening 27, and the warm air is distributed around over the floor or lower part of the room instead of rising to the top of the room. The result of this is that a room can be comfortably heated with considerably less fuel than is required by other types of heaters, therefore the cost of heating is less.

Inasmuch as the baffle plates 36 slope in the direction of the flow of travel of the air thereover and thereunder, and the slide plate 39 is so positioned that the slots 35 are closed, there will be no flow of air through the slots 35. However the baffles 36 will function to intercept the vertically travelling heat waves from the heating drum 42 and thereby reduce the amount of heat that can be transmitted to the air passing over the plate 33.

Now, if for any reason, the motor and fan 55—56 should stop, the flow of air would be stopped and the heating effect of the heater would be negligible. In this case the top cover plate 23 may be removed from the top 20 whereupon the slide plate 39 may be slipped to open the slots 35, whereupon the heat from the heating drum would induce an upward flow of air through the housing that would enter the housing through the openings 27 and 26a, and through the fan opening in the rear wall 19 of the housing. This incoming air would contact the heating drum 42 and pass upwardly between the baffles 36 and through the slots 35 and the registering slots 40 in the slide plate 39 and then upwardly through the opening 22 and into the space to be heated. This of course is a natural convection current as will readily be understood.

The heater shown in Figures 9 to 12 inclusive operates in precisely the same way as in the foregoing description for Figures 4 to 8 inclusive except that the plate 59 and baffles 62 thereon function as an increased barrier against the upward flow of heat from the heating drum. However, the slots 60 will readily admit the passage of air upwardly upon the removal of the cover plate 23 as for the puropse previously described.

Such modifications of my invention may be employed as lie within the scope of the appended claims without departing from the spirit and intention of my invention. Now having fully shown and described my invention, I claim:

1. In a heater of the character described, the combination of an external housing, a sub-housing positioned inside the external housing and spaced therefrom, said housings defining an insulating passage between them; a heating drum positioned inside the sub-housing, said sub-housing and drum defining a heating passage between them; burner means for heating the interior of said drum; passage forming means at the base of the heater for the horizontal discharge of a layer of cool air at the level of the floor; heated air discharge means, located just above said cool air discharge passage, and in communication with said insulating passage and with said heating passage, for receiving heated air from both said passages, and discharging said heated air onto the aforesaid layer of cool air; said insulating passage communicating with said heated air discharge means at the outer, upper portion thereof, so as to supply to said heated air discharge means an upper layer of slightly warmed air for discharge therefrom, and fan means communicating with said cool air discharge means, with said heating passage and with said insulating passage, for causing cool air to circulate through said cool air discharge passage, and for causing air to circulate through said insulating passage and through said heating passage, the air in the insulating and heating passages becoming heated and then being discharged onto said cool air layer as aforesaid.

2. The combination as claimed in claim 1, including adjustable means in the top of said sub-housing, for controlling the flow of air between said heating passage and said insulating passage.

3. The combination as claimed in claim 1, including adjustable means in the top of said sub-housing, for controlling the flow of air between said heating passage and said insulating passage, and a removable closure in the top of the external housing, immediately above said adjustable means in the top of the sub-housing.

EUGENE W. LOGUE.